(12) United States Patent
Pieriboni

(10) Patent No.: US 9,227,760 B2
(45) Date of Patent: Jan. 5, 2016

(54) DRIP STOP DEVICE

(76) Inventor: Antonio Pieriboni, Vicentino (IT)

( * ) Notice: Subject to any disclaimer, the term of this patent is extended or adjusted under 35 U.S.C. 154(b) by 0 days.

(21) Appl. No.: 14/240,686

(22) PCT Filed: Aug. 31, 2012

(86) PCT No.: PCT/EP2012/067014
§ 371 (c)(1),
(2), (4) Date: Feb. 24, 2014

(87) PCT Pub. No.: WO2013/030363
PCT Pub. Date: Mar. 7, 2013

(65) Prior Publication Data
US 2014/0217133 A1    Aug. 7, 2014

(30) Foreign Application Priority Data
Sep. 2, 2011  (IT) ................ VI2011A0238

(51) Int. Cl.
| B65D 23/06 | (2006.01) |
| B65D 47/40 | (2006.01) |
| A47J 36/14 | (2006.01) |

(52) U.S. Cl.
CPC .............. B65D 23/065 (2013.01); B65D 47/40 (2013.01); *A47J 36/14* (2013.01)

(58) Field of Classification Search
CPC ...... B67D 23/065; B67D 23/06; B67D 47/40; B65D 23/065; B65D 23/06; B65D 47/40; A47J 36/14
USPC .................................. 222/566–567, 569, 571
See application file for complete search history.

(56) References Cited

U.S. PATENT DOCUMENTS

| 2,054,265 | A | * | 9/1936 | Muguerditchian | ............ 141/332 |
| 2,193,805 | A | * | 3/1940 | Deschner | ...................... 222/562 |
| 5,121,779 | A | * | 6/1992 | Green | ............................ 141/337 |
| 5,651,481 | A | * | 7/1997 | Jensen | .......................... 222/566 |
| 5,979,718 | A | * | 11/1999 | Jinathan | ........................ 222/567 |
| 6,073,816 | A | * | 6/2000 | Granberg | ....................... 222/566 |
| 6,352,179 | B1 | * | 3/2002 | Andersen et al. | .............. 222/108 |
| 7,407,067 | B2 | * | 8/2008 | Kerkhof et al. | ................ 222/109 |
| 2005/0023308 | A1 | * | 2/2005 | Burato et al. | .................. 222/569 |
| 2006/0081649 | A1 | * | 4/2006 | Kerkhof et al. | ............... 222/108 |
| 2010/0116854 | A1 | * | 5/2010 | Gumpold | ....................... 222/566 |

FOREIGN PATENT DOCUMENTS

| EP | 0 560 777 B1 | 1/1997 |
| FR | 2 773 535 A1 | 7/1999 |

OTHER PUBLICATIONS

International Search Report and Written Opinion dated Dec. 11, 2012, issued in PCT Application No. PCT/EP2012/067014, filed Aug. 31, 2012.

* cited by examiner

*Primary Examiner* — Frederick C Nicolas
(74) *Attorney, Agent, or Firm* — Workman Nydegger

(57) ABSTRACT

A drip stop device (1) for a container for liquids (C) is arranged at the outlet opening (A) of a container (C) to allow liquid to be poured without drips. The device (1) includes a first plate-like element (2) introduced, in the rolled-up configuration, in the outlet opening (A) to define a tubular duct (21). A second plate-like element (3) that substantially develops along a longitudinal direction is superimposed on a surface (22) of first plate-like element (2) with a first end (31) fixed to a perimeter portion (23) of first plate-like element (2) so that when first plate-like element (2) is rolled up substantially along the longitudinal axis (x) of second plate-like element (3), longitudinal sides (32, 33) of second plate-like element (3) come into contact with surface (22) to define one or more forced routes for the liquid flowing out of the container (C).

12 Claims, 9 Drawing Sheets

DRIP STOP DEVICE

BACKGROUND OF THE INVENTION

1. Field of the Invention

The present invention concerns a drip stop device suited to be arranged at the level of the outlet opening of a liquid container, in particular a bottle of wine, capable of improving the oxygenation of the liquid while this flows out of said container.

2. Present State of the Art

It is known that the drip stop devices belonging to the known art are suited to be arranged at the level of the outlet opening of a liquid container, in particular on the end of a bottle neck, in such a way as to support the liquid while it flows out and to avoid the formation of drips and sprays.

Among the several types of drip stop devices belonging to the prior art, the drip stop device described in patent EP0560777 is known, which is easy to use, economic and universal.

This drip stop device, in particular, comprises a disc made of an elastic and flexible material which, to be able to be used as a drip stopper, needs to be rolled up in such a way as to form a substantially tubular duct and must be partially introduced in said outlet opening of the container.

Thanks to the elasticity and flexibility of the material used to make it, said drip stop device, once introduced in the opening of the container, naturally tends to unroll in order to assume its original disc-shaped configuration, thus perfectly adapting to the inner edge of the opening.

This last characteristic thus allows this type of drip stop device to be universal, independently of the size of the outlet opening of the container.

However, said type of drip stop device, as well as most of the drip stop devices of the known art, only defines a hollow tubular duct in which the liquid, especially wine, flows along a linear direction, without encountering obstacles. In fact, said type of drip stop device has been designed and produced only for the purpose of avoiding the formation of drips and sprays while the liquid, especially wine, is being poured, and not to obtain also the oxygenation of the same.

In fact, as is known, wine is kept inside its container for long periods and therefore needs to come into contact with air in such a way as to be re-oxygenated and to be able to give forth all its aromas again.

To disadvantage, the use of said drip stop devices of the known art does not allow the oxygenation of the liquid, especially wine, to be guaranteed, and therefore the latter cannot give forth all its aromas.

The present invention aims to overcome the drawbacks listed above.

SUMMARY OF THE INVENTION

In particular, it is the object of the invention to provide a drip stop device that is easy to use, economic and universal.

Furthermore, it is the object of the invention to provide a drip stop device that is capable of optimizing the oxygenation of the liquid, in particular wine, that flows through it.

The objects described above are achieved by the drip stop device having the characteristics illustrated in the main claim.

Further characteristics of the drip stop device are described in the dependent claims.

BRIEF DESCRIPTION OF THE DRAWINGS

The objects described above and further advantages will be highlighted in greater detail in the descriptions of some preferred embodiments of the invention that are provided as indicative, non-limiting examples, with reference to the enclosed drawings, wherein.

DETAILED DESCRIPTION OF THE PREFERRED EMBODIMENTS

The drip stop device for a liquid container that is the subject of the invention is shown as a whole in four different embodiments in figures from 1 to 20, where it is indicated by 1.

Figure 21:
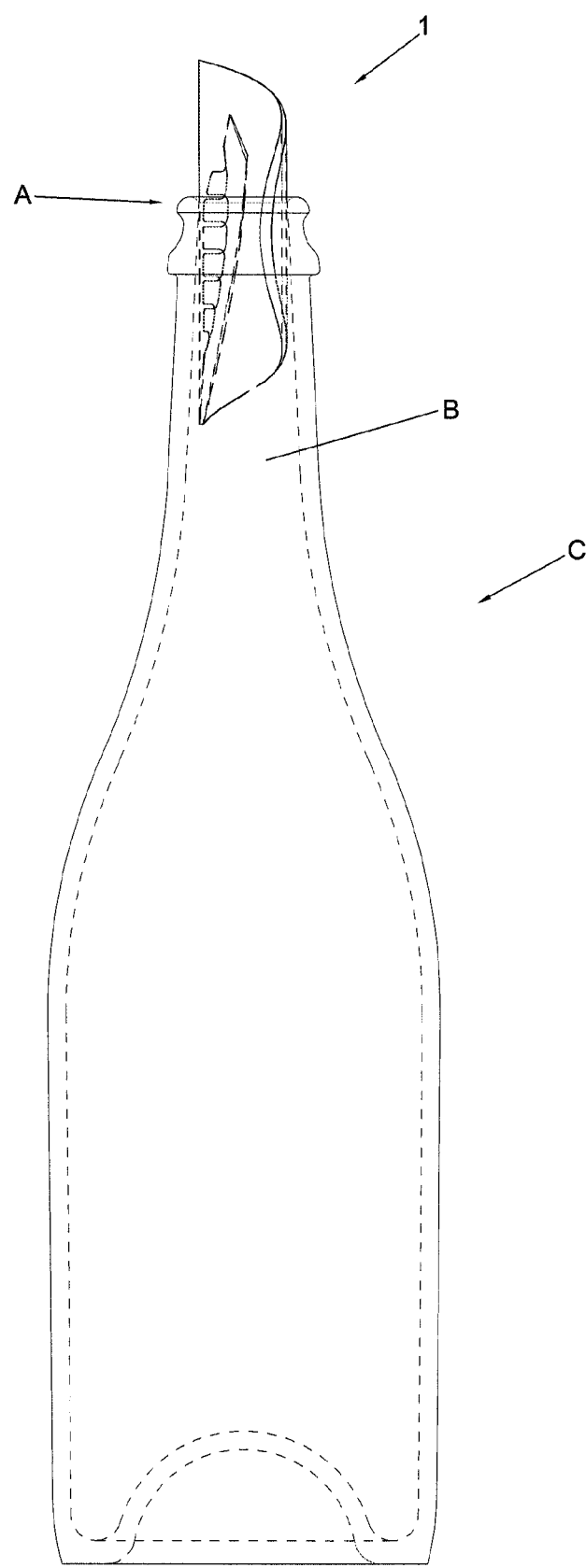
FIG. 21 shows a side cross-section view according to a vertical plane of a bottle for liquids with the drip stop device of the invention introduced in its outlet opening.

As shown in FIG. 21, said drip stop device 1 is suited to be arranged at the level of the outlet opening A of a container C, in particular of a bottle B, so as to allow the liquid, in particular wine, to be poured while at the same time avoiding the formation of drips and sprays.

The drip stop device 1 of the invention, as can be seen in the four embodiments respectively shown in FIGS. 1, 6, 11 and 16, comprises a first plate-like element 2 made of an elastic and flexible material, which during use as a drip stop device is introduced in a rolled-up configuration into the outlet opening A of the container C, as already explained, so as to define a tubular duct 21, as shown in FIGS. 5, 10, 15 and 20.

According to the invention, the drip stop device 1 also comprises a second plate-like element 3 made of an elastic and flexible material, which substantially develops in a longitudinal direction and is smaller than said first plate-like element 2, as shown in FIGS. 1, 6, 11 and 16.

Preferably but not necessarily, the first and the second plate-like elements 2 and 3 constitute a single body obtained through a single moulding operation. In particular, the two plate-like elements 2 and 3 are joined at the level of the first end 31 of the second plate-like element 3.

Successively, the second plate-like element 3 is folded along said first end 31 so as to obtain the superimposition of said second plate-like element 3 on one of the surfaces 22 of the first plate-like element 2, as shown in FIGS. 1, 6, 11 and 16.

It cannot be excluded, however, that in different embodiments of the drip stop device 1 of the invention the first and the second plate-like elements 2 and 3 are produced separately.

Also in this case, successively, the second plate-like element 3 is positioned so that it is superimposed on one of the surfaces 22 of the first plate-like element 2.

However, independently of which one of the two variants just described is chosen to obtain the two plate-like elements 2 and 3, a fastening point is created between the portion of the second plate-like element 3 defined around its first end 31 and the perimeter portion 23 of the first plate-like element 2, as shown again in FIGS. 1, 6, 11 and 16.

Figure 5:
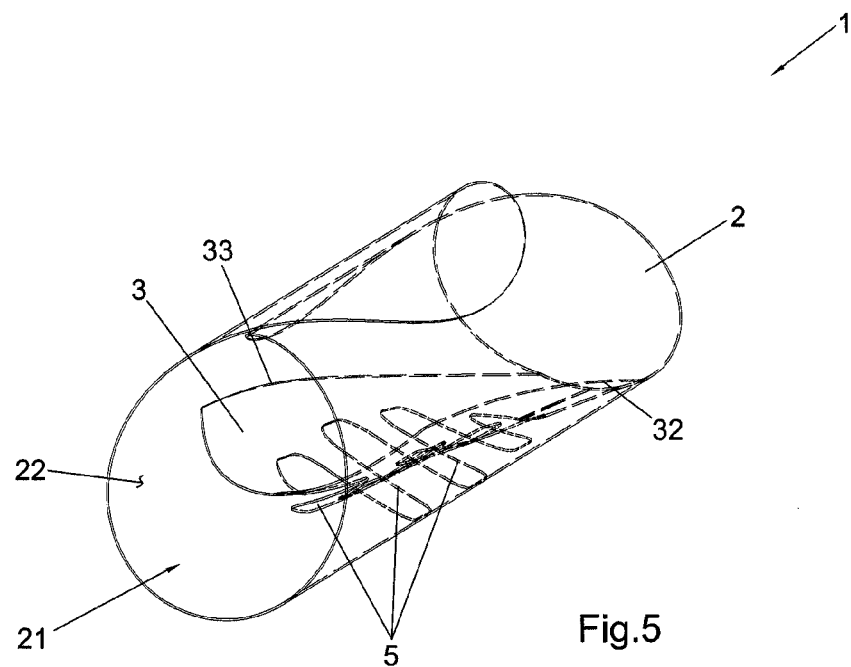
FIG. 5 shows an axonometric view of the first embodiment of the drip stop device of the invention shown in FIG. 1 when rolled up in the operating configuration.
Figure 4:
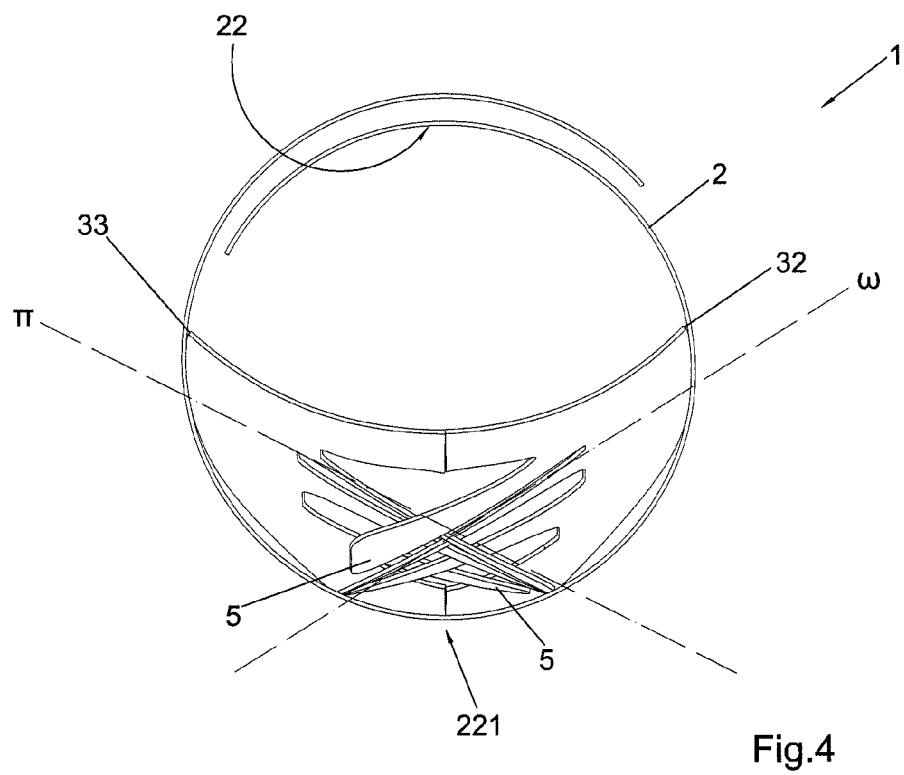
FIG. 4 shows a front view of the first embodiment of the drip stop device of the invention shown in FIG. 1 when rolled up in the operating configuration.
Figure 10:
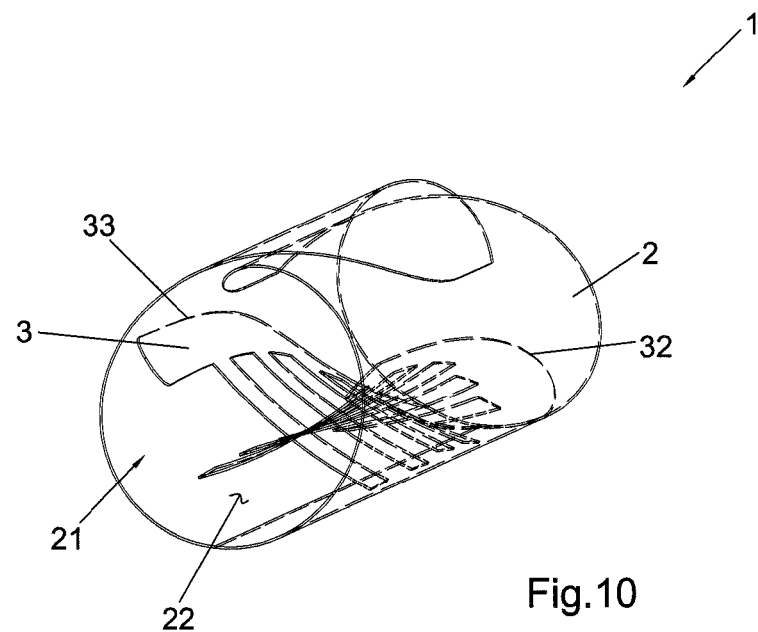
FIG. 10 shows an axonometric view of the second embodiment of the drip stop device of the invention shown in FIG. 6 when rolled up in the operating configuration.
Figure 9:
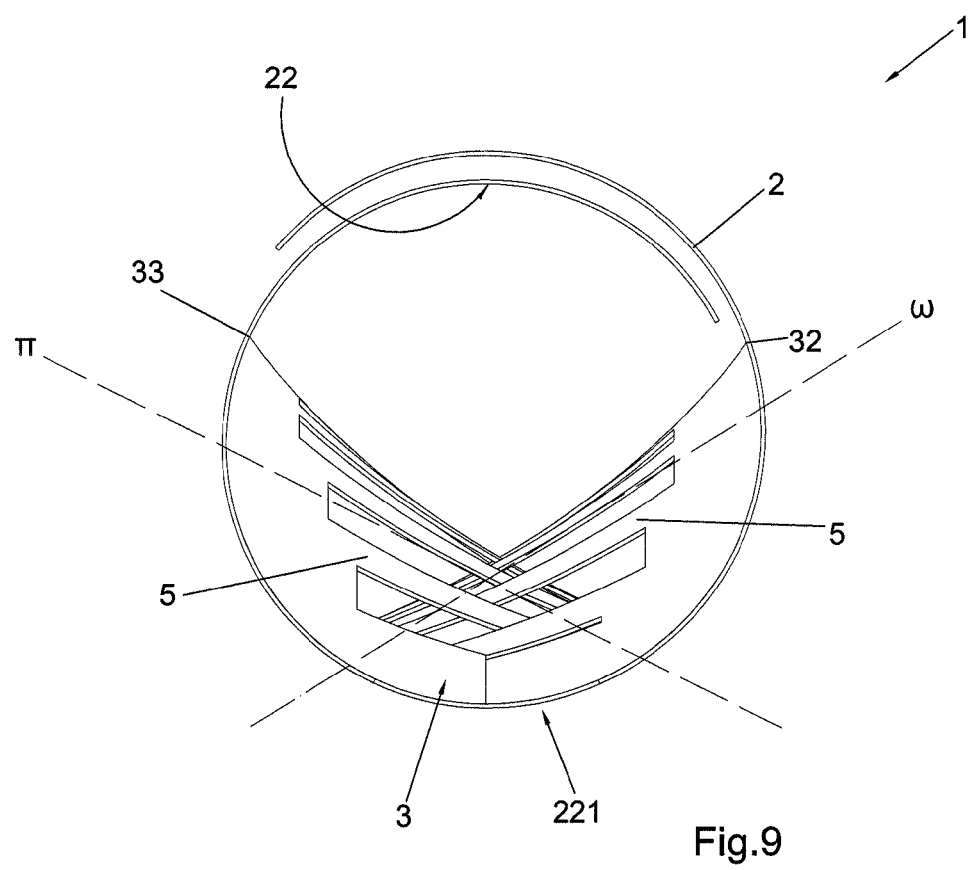
FIG. 9 shows a front view of the second embodiment of the drip stop device of the invention shown in FIG. 6 when rolled up in the operating configuration.
Figure 15:
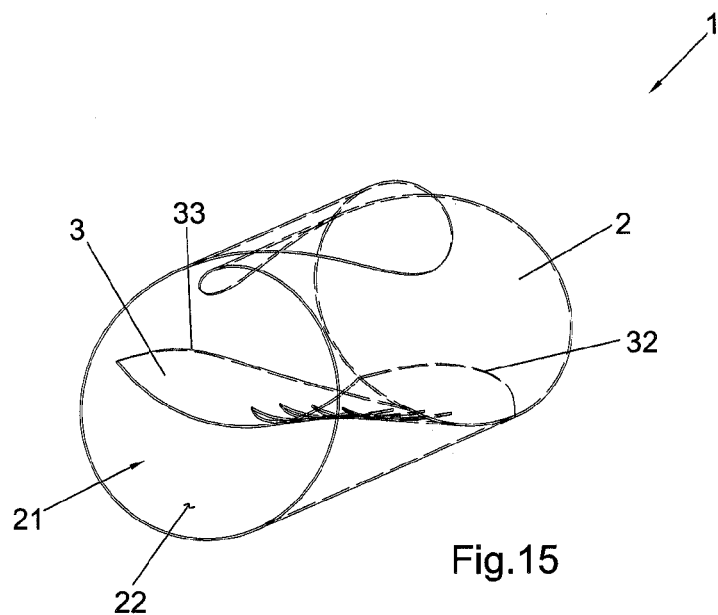
FIG. 15 shows an axonometric view of the third embodiment of the drip stop device of the invention shown in FIG. 11 when rolled up in the operating configuration.
Figure 14:
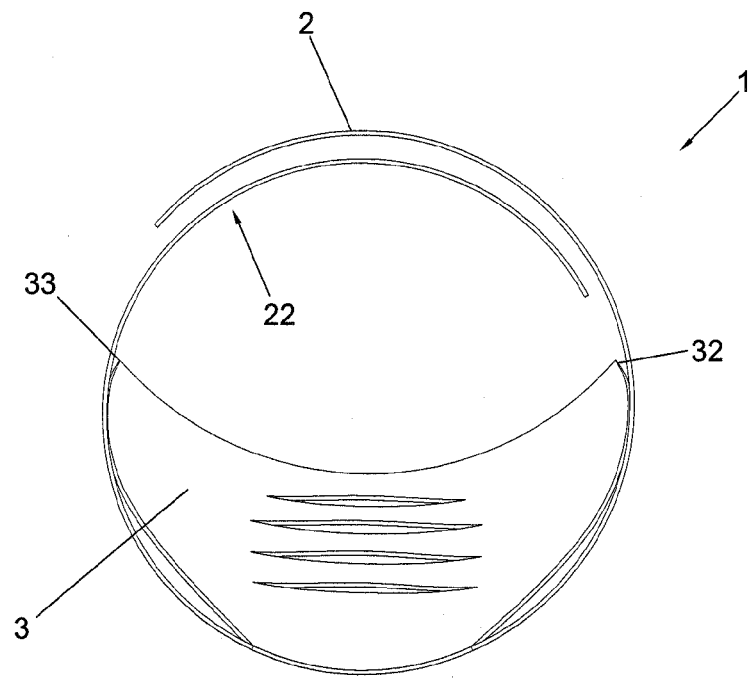
FIG. 14 shows a front view of the third embodiment of the drip stop device of the invention shown in FIG. 11 when rolled up in the operating configuration.
Figure 20:
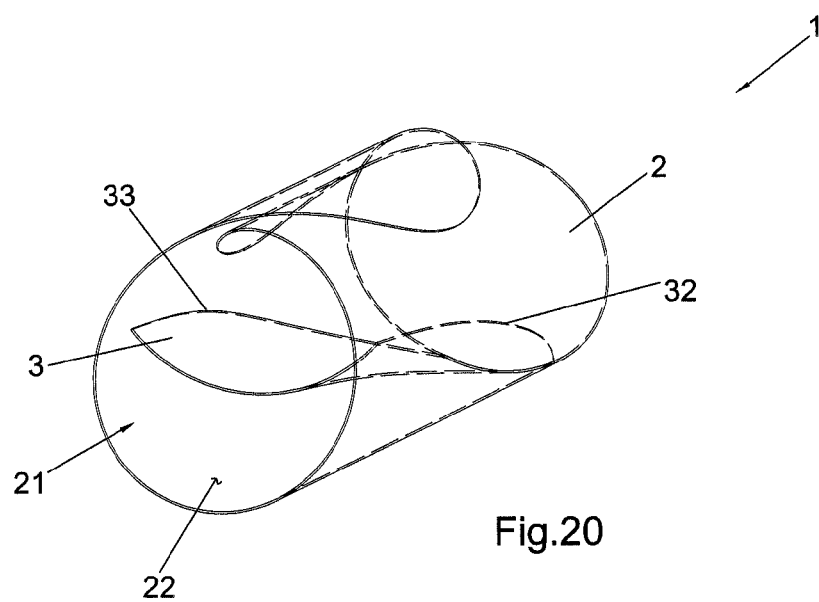
FIG. 20 shows an axonometric view of the fourth embodiment of the drip stop device of the invention shown in FIG. 16 when rolled up in the operating configuration.
Figure 19:
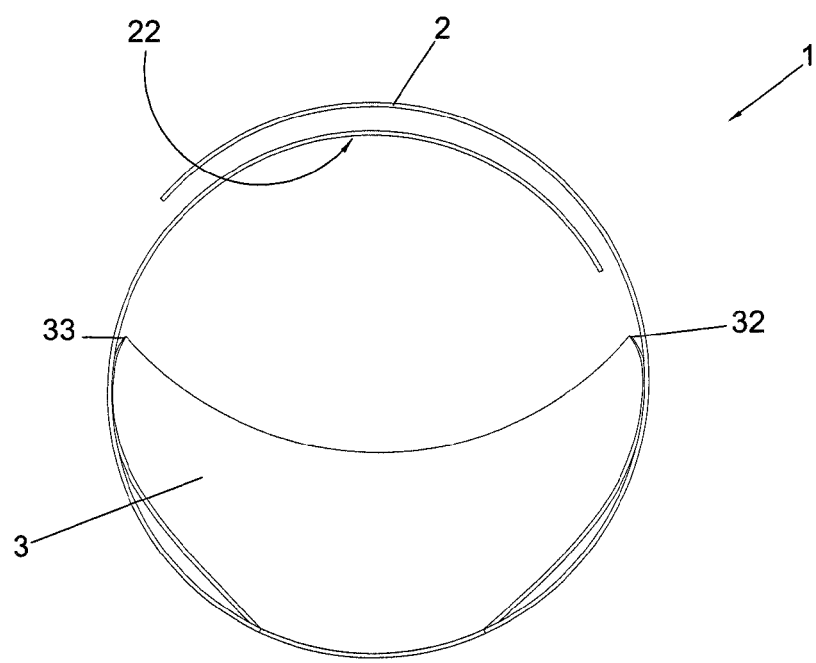
FIG. 19 shows a front view of the fourth embodiment of the drip stop device of the invention shown in FIG. 16 when rolled up in the operating configuration.

Said fastening point allows the second plate-like element 3 to substantially assume the shape of "cradle" and to be raised with respect to the portion of the surface 22 on which it was placed in the rest configuration, so that it is arranged crosswise within said tubular duct 21 when the first plate-like element 2 is rolled up substantially along the longitudinal axis x of the second plate-like element 3 and the longitudinal sides 32 and 33 of the second plate-like element 3 come into contact with the surface 22 of the first plate-like element 2 and are pushed by said surface 22 during the folding stage, as shown in FIGS. 4 and 5 illustrating the first embodiment of the invention, in FIGS. 9 and 10 illustrating the second embodiment, in FIGS. 14 and 15 illustrating the third embodiment and finally in FIGS. 19 and 20 illustrating the fourth embodiment of the drip stop device 1.

The special, substantially cradle-shaped and transversal configuration assumed by the second plate-like element 3 inside the tubular duct 21 defined by the first plate-like element 2 when rolled up makes it possible to define one or more forced routes of the liquid flowing out of its container C.

Consequently, the presence and the position of the second plate-like element 3 inside the tubular duct 21 makes it possible to alter the normal linear route that the liquid would follow in the absence of said second plate-like element 3, making it more turbulent and thus achieving the object of the invention to increase the oxygenation of the liquid while it flows out of the container C.

Figure 1:
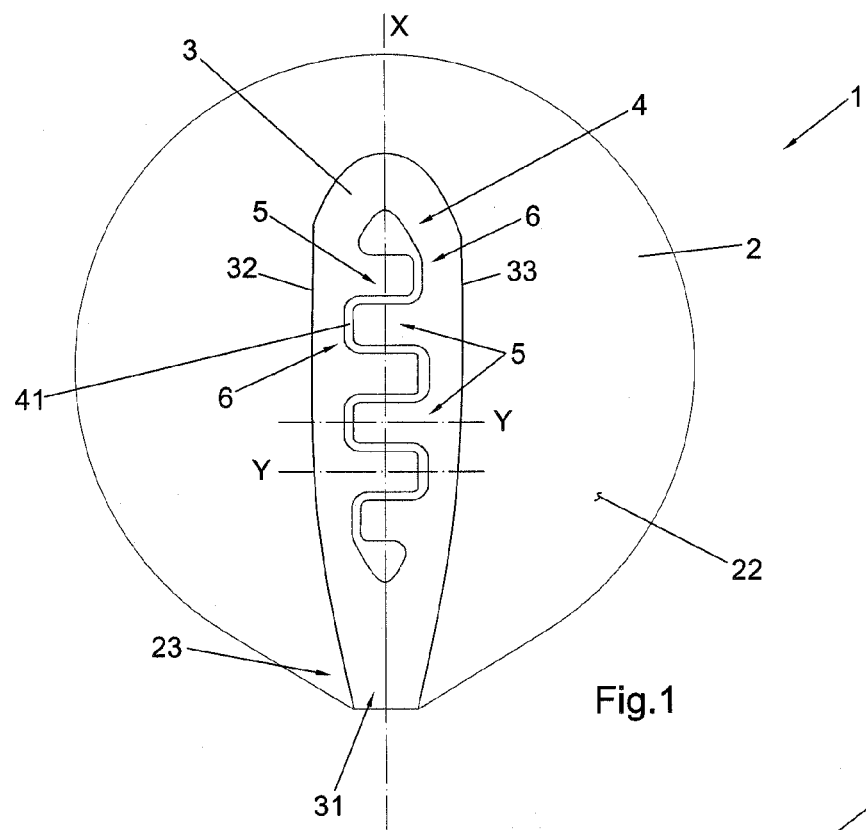
FIG. 1 shows a plan view of a first embodiment of the drip stop device of the invention when at rest.
Figure 6:
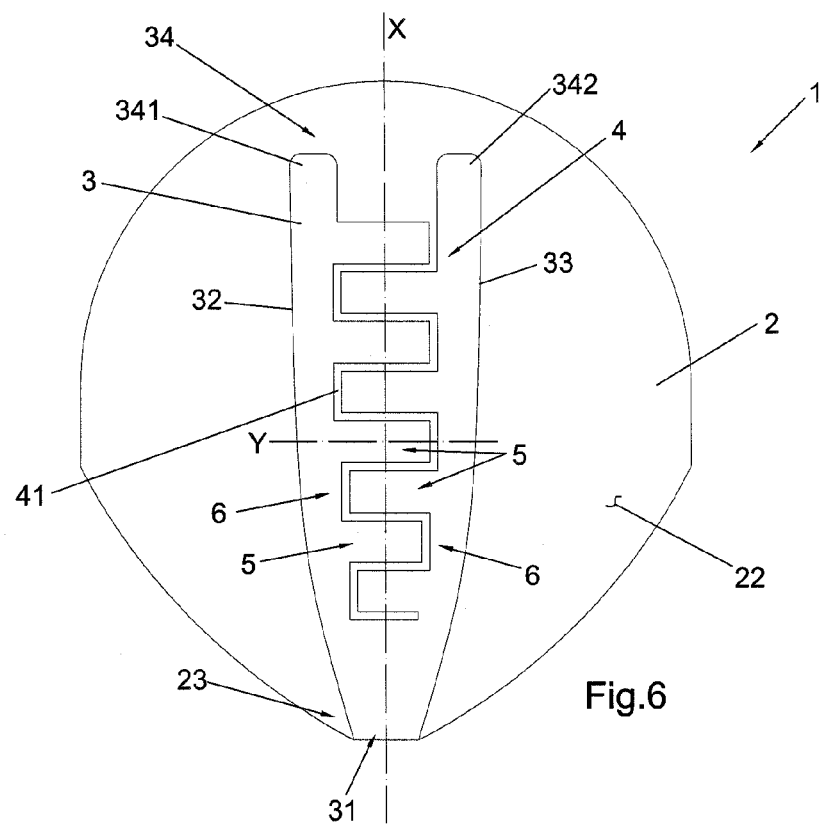
FIG. 6 shows a plan view of a second embodiment of the drip stop device of the invention when at rest.
Figure 11:
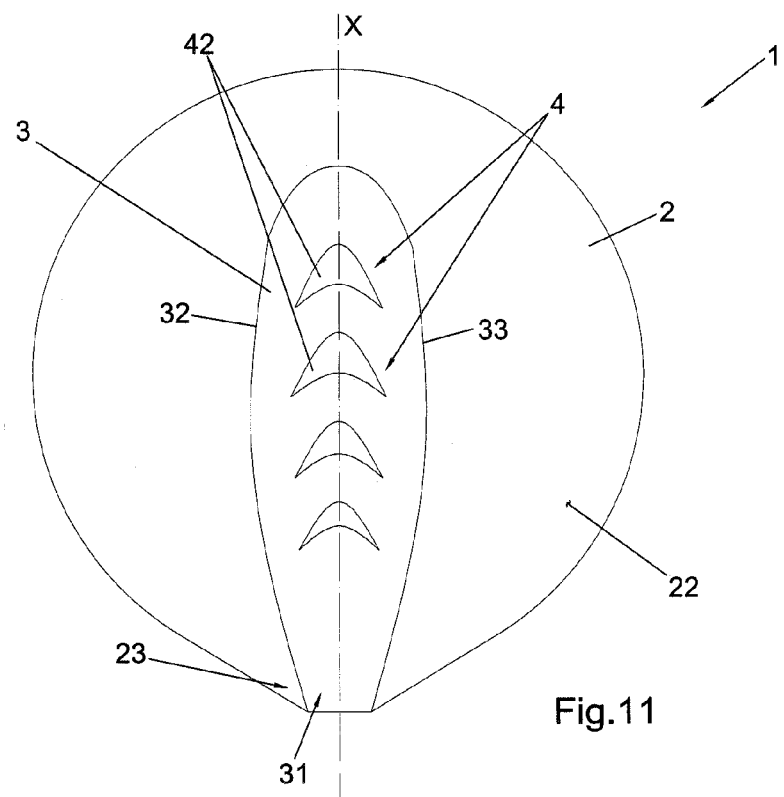
FIG. 11 shows a plan view of a third embodiment of the drip stop device of the invention when at rest.
Figure 12:
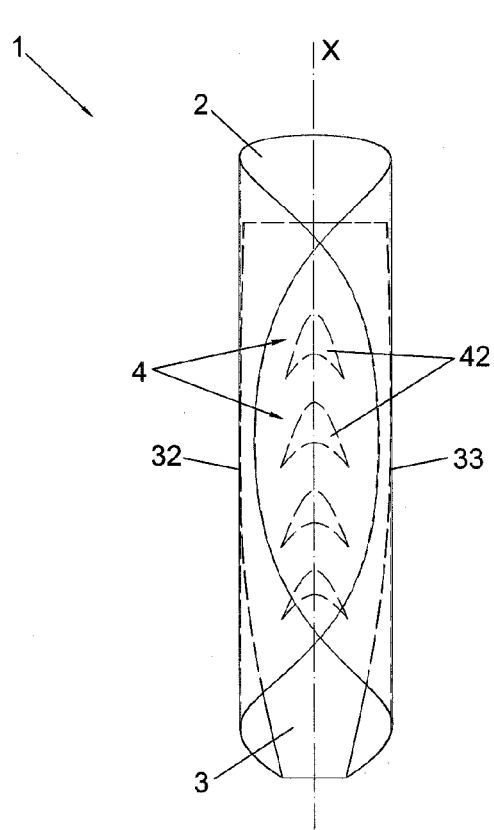
FIG. 12 shows a plan view of the third embodiment of the drip stop device of the invention shown in FIG. 11 when rolled up in the operating configuration.
Figure 13:
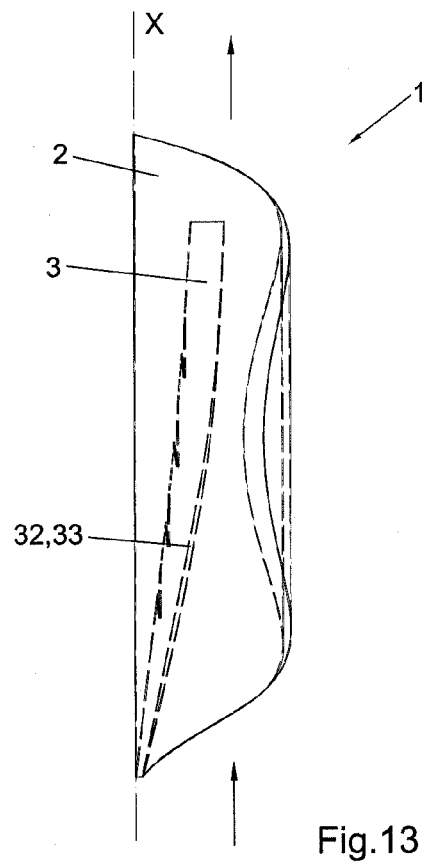
FIG. 13 shows a side view of the third embodiment of the drip stop device of the invention shown in FIG. 11 when rolled up in the operating configuration.

Preferably but not necessarily, the second plate-like element 3 is provided with one or more openings 4, as can be seen in the embodiments shown in FIGS. 1, 6 and 11, through which the liquid coming from the container C must flow, thus defining said forced routes.

Therefore, the presence of said openings 4 makes it possible to increase the turbulence effect to which the liquid is subjected, thus optimizing its oxygenation.

In particular, according to the first embodiment of the invention shown in FIG. 1 and the second embodiment shown in FIG. 6, said one or more openings 4 made in the second plate-like element 3 are defined by a slit 41 with zigzag development that, in turns, defines a plurality of consecutive projections 5 and recesses 6.

In this way the projections 5, when the first plate-like element 2 is rolled up and the second plate-like element 3 is arranged crosswise along the tubular duct 21, are arranged on two planes $\pi$ (pi) and $\omega$ (omega) intersecting each other, as shown in FIG. 4 and in FIG. 9, respectively.

Figure 3:
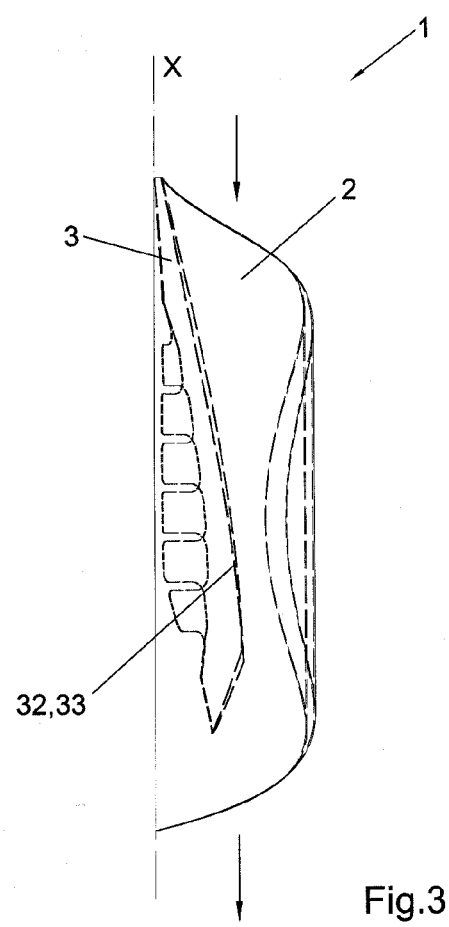
FIG. 3 shows a side view of the first embodiment of the drip stop device of the invention shown in FIG. 1 when rolled up in the operating configuration.
Figure 8:
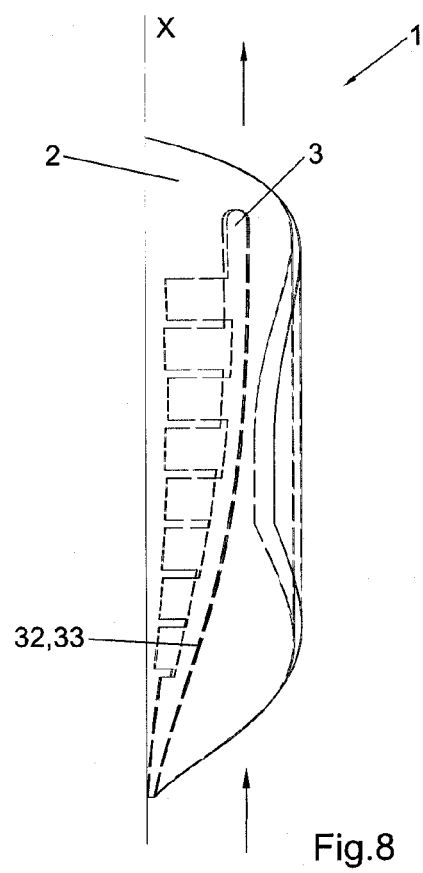
FIG. 8 shows a side view of the second embodiment of the drip stop device of the invention shown in FIG. 6 when rolled up in the operating configuration.

In particular, the size of the projections 5, as can be seen in FIGS. 3 and 8, is such that with their free ends they intercept the surface 22 of the first plate-like element 2, thus contributing to the action that lifts the second plate-like element 3 inside the tubular duct 21.

Preferably but not necessarily, as can be seen again in FIG. 4 and in FIG. 9, the two intersecting planes $\pi$ and $\omega$, on which said projections 5 lie, converge towards the portion 221 of the surface 22 of the first plate-like element 2, on which the liquid is suited to flow when it comes out of its container C.

Figure 2:
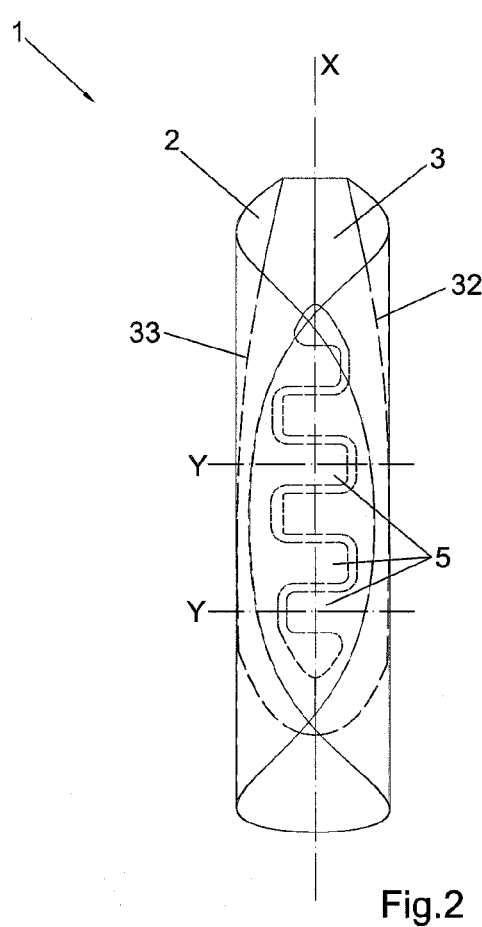
FIG. 2 shows a plan view of the first embodiment of the drip stop device of the invention shown in FIG. 1 when rolled up in the operating configuration.
Figure 7:
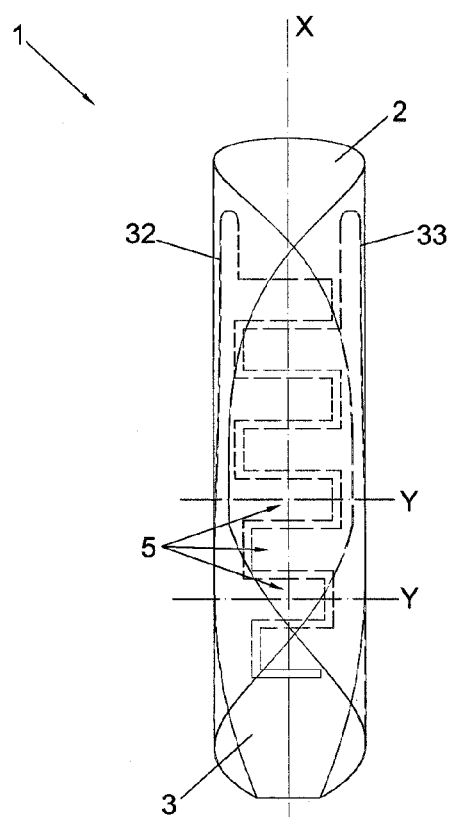
FIG. 7 shows a plan view of the second embodiment of the drip stop device of the invention shown in FIG. 6 when rolled up in the operating configuration.

Always according to the preferred embodiments of the invention shown in FIG. 1 and in FIG. 6, each one of said projections 5 has its axis of development y substantially orthogonal to the longitudinal axis x of the second plate-like element 3, as can be respectively seen also in FIGS. 2 and 7 showing the two different embodiments.

However, in different embodiments of the drip stop device 1 of the invention it is not necessary that the axes of development y of the projections 5 are substantially orthogonal to the longitudinal axis x of the second plate-like element 3, provided that in any case they assume a substantially transversal position in relation to the latter.

It cannot be excluded that in different embodiments of the invention said one or more openings 4 are simply holes 42, independent of one another, made in the second plate-like element 3, as can be seen in the embodiment shown in FIG. 11.

In this case, as can be seen again in FIG. 11, said holes 42 can have a special shape intended to favour and optimize the turbulence effect to which the liquid is subjected when flowing through the tubular duct 21, and thus to increase its oxygenation.

Figure 16:
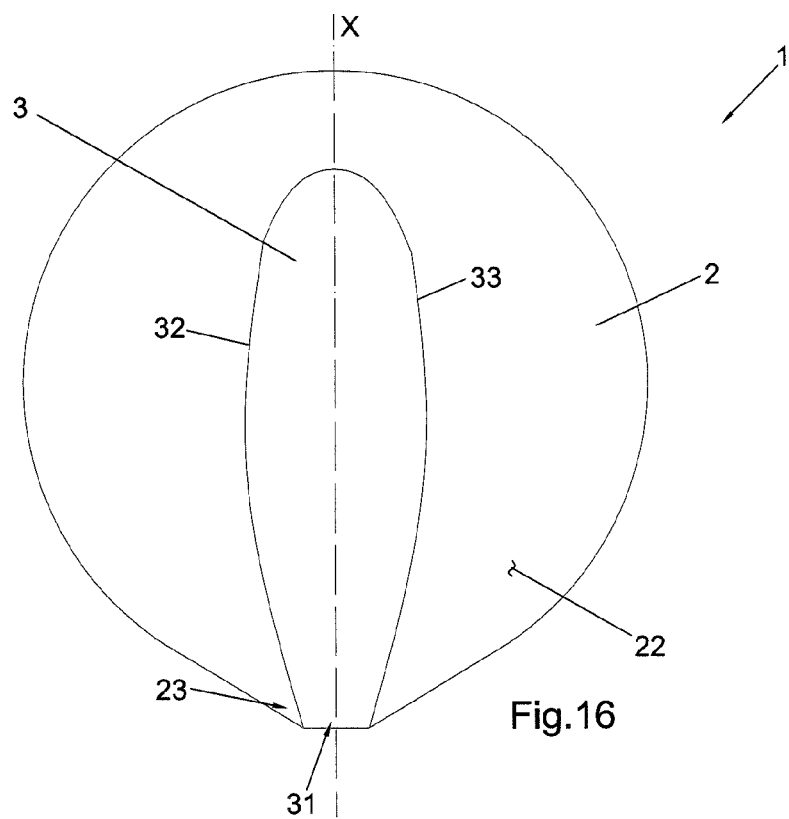
FIG. 16 shows a plan view of a fourth embodiment of the drip stop device of the invention when at rest.
Figure 17:
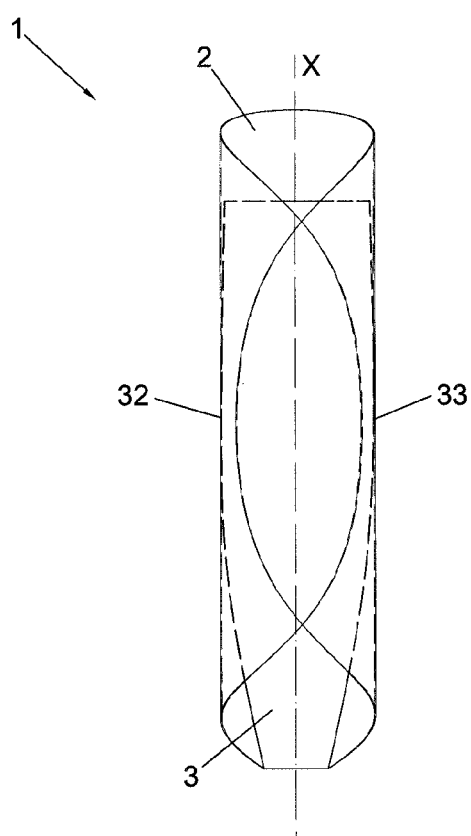
FIG. 17 shows a plan view of the fourth embodiment of the drip stop device of the invention shown in FIG. 16 when rolled up in the operating configuration.
Figure 18:
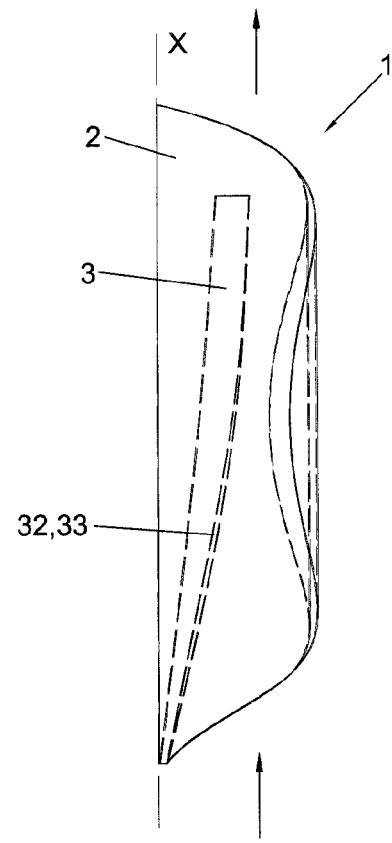
FIG. 18 shows a side view of the fourth embodiment of the drip stop device of the invention shown in FIG. 16 when rolled up in the operating configuration.

Besides, in further alternative embodiments of the drip stop device 1 of the invention, such as the one shown in FIG. 16, the second plate-like element 3 may not be provided with said one or more openings 4; in this case, the turbulence effect to which the liquid is subjected is determined exclusively by the transversal position assumed by the second plate-like element 3 along the tubular duct 21.

Concerning the fastening point between the first end 31 of the second plate-like element 3 and the perimeter portion 23 of the first plate-like element 2, this is preferably but not necessarily obtained through a welding operation.

In particular, ultrasonic welding can be used to obtain said fastening point.

Pressure welding or any other welding technique can be used as an alternative.

Furthermore, in different embodiments of the invention said fastening point can be obtained through a stapling operation or the use of rapid coupling means.

In particular, said coupling means, not shown in the figures, may comprise a seat, created in the first plate-like element 2, and a tab, created in the second plate-like element 3.

Said tab, in particular, may comprise two counteracting elements that, once the tab has been introduced in the seat, prevent the first and the second plate-like elements 2 and 3 from coming off each other.

Furthermore, as can be seen in the embodiment of the drip stop device 1 of the invention shown in FIG. 6, in addition to a fastening point between the first and the second plate-like elements 2 and 3 at the level of said first end 31, a further fastening point can be provided at the level of the second end 34 of the second plate-like element 3.

In particular, as shown again in FIG. 6, the second plate-like element 3 can be fixed to the surface 22 of the first plate-like element 2 at the level of both the angular areas 341 and 342 of its second end 34.

Said construction variant, which includes a further fastening point, is possible also for the embodiments of the drip stop device 1 of the invention shown in FIGS. 1, 11 and 16, respectively.

Furthermore, according to all the embodiments described up to now and their possible variants, the material of which the first and the second plate-like elements 2 and 3 are made is preferably but not necessarily a smooth and impermeable material.

In particular, said material is preferably selected between plastic and metal sheet.

Furthermore, according to all the embodiments described up to now and the possible variants of the drip stop device 1 of the invention, the first plate-like element 2 has preferably but not necessarily a substantially circular shape and the second plate-like element 3 is arranged in such a way as to be superimposed on the surface 22, substantially at the level of a diameter of the latter.

It cannot be excluded, however, that in different embodiments of the invention the first plate-like element 2 can have a shape different from the circular shape, for example the shape of a quadrilateral, provided that, once it has been rolled up, it makes it possible to define a tubular duct 21 and that the second plate-like element 3 is interposed along the same tubular duct 21.

In practice, all the embodiments of the drip stop device 1 of the invention when at rest have a flat configuration, as shown in FIGS. 1, 6, 11 and 16.

In particular, said flattened configuration of the drip stop device 1 of the invention and thus the precise superimposition of the two plate-like elements 2 and 3 are guaranteed by the presence of said fastening point at the level of the first end 31 of the second plate-like element 3 and of the perimeter portion 23 of the first plate-like element 2.

When the user intends to use said device of the invention as a drip stopper, as explained in detail above, he/she has to roll up the first plate-like element 2 along the longitudinal axis x of the second plate-like element 3, in such a way as to obtain a configuration of the two plate-like elements 2 and 3 like the one shown in FIGS. 3, 8, 13 and 18, respectively.

In particular, according to said configuration the second plate-like element 3 substantially assumes the shape of a cradle and a raised and transversal position inside the tubular duct 21, said shape and position being obtained by rolling up the first plate-like element 2.

Once the drip stop device 1 has been formed, it is preferably but not necessarily introduced in the outlet opening A of a container C, from the side where said fastening point is created, between the first end 31 of the second plate-like element 3 and the perimeter portion 23 of the first plate-like element 2.

In this way, the liquid flowing out of said container C passes through the drip stop device 1 of the invention in the direction shown by the arrows in FIGS. 3, 8, 13 and 18, thus optimizing the turbulence effect to which the liquid is subjected.

However, it cannot be excluded that the drip stop device 1 of the invention can be introduced in the outlet opening A also from the side opposite said fastening point.

On the basis of the above, it is clear that the drip stop device 1 that is the subject of the invention achieves all the set objects.

In particular, the invention achieves the object to provide a drip stop device that is easy to use, economic and universal.

Furthermore, the invention also achieves the object to provide a drip stop device that is capable of optimizing the oxygenation of the liquid, in particular wine, that flows through it.

During the construction phase, the drip stop device that is the subject of the invention may undergo further changes that, though not illustrated or described herein, shall nonetheless be covered by the present patent, provided that they come within the scope of the claims that follow.

Where technical features mentioned in any claim are followed by reference signs, those reference signs have been included for the sole purpose of increasing the intelligibility of the claims and accordingly such reference signs do not have any limiting effect on the protection of each element identified by way of example by such reference signs.

The invention claimed is:

1. A drip stop device for a liquid container, the drip stop device configured to be associated with an outlet opening of the liquid container in such a way as to allow a liquid to be poured from the liquid container through the drip stop device such that the drip stop device prevents drippage of the liquid when the liquid container is returned to a vertical position, the drip stop device comprising:

a first plate-like element made of an elastic and flexible material and having an interior surface and a perimeter portion, the first plate-like element being configured to be rolled up to form a tubular duct so that the first plate-like element can be introduced into the outlet opening of the liquid container, and an elongated second plate-like element made of an elastic and flexible material and having a longitudinal axis, the second plate-like element being smaller than the first plate-like element and having opposing longitudinal sides that extend between a first end and an opposing second end, the second plate-like element being superimposed on the interior surface of the first plate-like element with the first end of the second plate-like element fixed to the perimeter portion of the first plate-like element so that when the first plate-like element is rolled up substantially about the longitudinal axis of the second plate-like element, the longitudinal sides of the second plate-like element contact the interior surface of the first plate-like element and force the second plate-like element to be extend crosswise along the tubular duct so as to form one or more forced routes for the liquid flowing out of the liquid container.

2. The drip stop device as recited in claim 1, wherein one or more openings are defined in the second plate-like element so that when the second plate-like element is arranged crosswise along the tubular duct the one or more forced routes for the liquid are defined through the one or more openings.

3. The drip stop device as recited in claim 2, wherein the one or more openings made in the second plate-like element are defined by a slit with a zigzag architecture that further defines a plurality of consecutive projections and recesses so that the plurality of consecutive projections and recesses are arranged on two planes intersecting each other when the first plate-like element is rolled up and the second plate-like element is arranged crosswise along the tubular duct.

4. The drip stop device as recited in claim 3, wherein the two intersecting planes converge towards a portion of the interior surface of the first plate-like element on which the liquid is suited to flow when the liquid comes out of the liquid container.

5. The drip stop device as recited in claim 3, wherein an axis of development for each one of the plurality of consecutive projections and recesses lies crosswise with respect to the longitudinal axis of the second plate-like element.

6. The drip stop device as recited in claim 5, wherein the axis of development for each one of the plurality of consecutive projections and recesses is substantially orthogonal to the longitudinal axis of the second plate-like element.

7. The drip stop device as recited in claim 2, wherein the one or more openings are one or more holes.

8. The drip stop device as recited in claim 1, wherein the first end of the second plate-like element is fixed to the perimeter portion of the first plate-like element through a weld.

9. The drip stop device as recited in claim 1, wherein the first end of the second plate-like element is fixed to the perimeter portion of the first plate-like element through a means for rapid coupling.

10. The drip stop device as recited in claim 9, wherein the means for rapid coupling comprise a seat created in the first plate-like element and a tab created on the second plate-like element with one or more counteracting elements being defined on the tab so that when the tab is inserted in the seat, the one or more counteracting elements prevent the first and the second plate-like elements from separating.

11. The drip stop device as recited in claim 1, wherein the first and the second plate-like elements are made of a smooth and impermeable material.

12. The drip stop device as recited in claim 1, wherein the first plate-like element is substantially circular in shape and the second plate-like element is arranged so that the second plate-like element is superimposed on the interior surface of the first plate-like element at substantially the diameter of the first plate-like element.

* * * * *

UNITED STATES PATENT AND TRADEMARK OFFICE
CERTIFICATE OF CORRECTION

| | | |
|---|---|---|
| PATENT NO. | : 9,227,760 B2 | Page 1 of 1 |
| APPLICATION NO. | : 14/240686 | |
| DATED | : January 5, 2016 | |
| INVENTOR(S) | : Pieriboni | |

It is certified that error appears in the above-identified patent and that said Letters Patent is hereby corrected as shown below:

Title Page
Inventor, City, Country, change "Antonio Pieriboni, Vicentino (IT)" to --Antonio Pieriboni, Montebello Vicentino (IT)--

Signed and Sealed this
Tenth Day of May, 2016

Michelle K. Lee
*Director of the United States Patent and Trademark Office*